United States Patent
Jahan et al.

(10) Patent No.: US 10,859,688 B2
(45) Date of Patent: Dec. 8, 2020

(54) METHOD FOR LOCATING ELECTROMAGNETIC PULSE EMISSION SOURCES IN AN ENVIRONMENT INCLUDING REFLECTORS

(71) Applicant: THALES, Courbevoie (FR)

(72) Inventors: Daniel Jahan, Brest (FR); Romain Giacometti, Brest (FR); Cédric Cornu, Brest (FR)

(73) Assignee: Thales, Courbevoie (FR)

( * ) Notice: Subject to any disclaimer, the term of this patent is extended or adjusted under 35 U.S.C. 154(b) by 245 days.

(21) Appl. No.: 16/003,087

(22) PCT Filed: Dec. 14, 2016

(86) PCT No.: PCT/EP2016/081069
§ 371 (c)(1),
(2) Date: Jun. 7, 2018

(87) PCT Pub. No.: WO2017/102884
PCT Pub. Date: Jun. 22, 2017

(65) Prior Publication Data
US 2019/0033437 A1    Jan. 31, 2019

(30) Foreign Application Priority Data

Dec. 15, 2015 (FR) ..................................... 15 02593

(51) Int. Cl.
*G01S 3/02* (2006.01)
*G01S 11/02* (2010.01)
(Continued)

(52) U.S. Cl.
CPC ............. *G01S 11/02* (2013.01); *G01S 5/0273* (2013.01); *G01S 5/14* (2013.01); *G01S 13/06* (2013.01);
(Continued)

(58) Field of Classification Search
USPC .................... 342/458, 118, 146, 147, 417
See application file for complete search history.

(56) References Cited

U.S. PATENT DOCUMENTS

| | | | |
|---|---|---|---|
| 8,188,923 B2* | 5/2012 | Ferreol | G01S 5/12 342/464 |
| 8,718,674 B2* | 5/2014 | Germond | G01S 5/0215 455/456.1 |

(Continued)

FOREIGN PATENT DOCUMENTS

EP    2428810 A1    3/2012

OTHER PUBLICATIONS

PCT Patent Application PCT/EP2016/081069, Rapport De Recherche Internationale, Mar. 2, 2017, 3 pages.

*Primary Examiner* — Chuong P Nguyen
(74) *Attorney, Agent, or Firm* — Soquel Group LLC

(57) ABSTRACT

The invention relates to a method for locating at least two sources emitting electromagnetic pulses in an environment comprising two reflectors.

Figure 1:
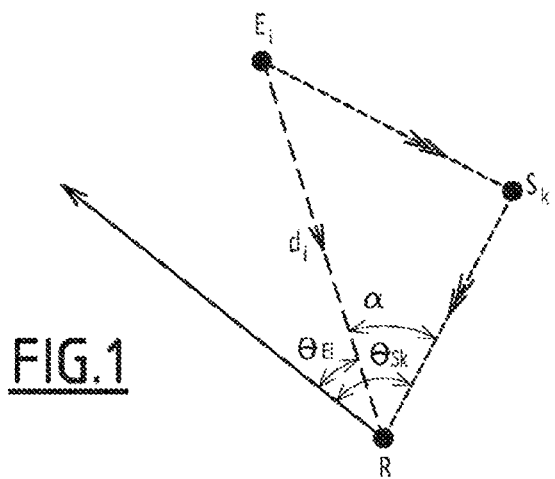

The method comprises receiving, by a detector, for each source to be located, at least one same emitted pulse, received directly from said source and received by reflection on one of the reflectors.

The method further comprises:
identification of the pulses received directly and the pulses received by reflection,
grouping by pairs of pulses received directly with pulses received by reflection,
calculating, for each pair, the difference between the date of arrival of the pulse received by reflection relative to the date of arrival of the pulse received directly, and
determining the distance of each source from the detector from calculated differences in dates of arrival.

10 Claims, 2 Drawing Sheets

(51) Int. Cl.
*G01S 5/02* (2010.01)
*G01S 13/08* (2006.01)
*G01S 13/06* (2006.01)
*G01S 5/14* (2006.01)
*G01S 5/12* (2006.01)
*G01S 7/4863* (2020.01)
*G01S 13/00* (2006.01)
*H04B 7/08* (2006.01)

(52) U.S. Cl.
CPC ................ *G01S 13/08* (2013.01); *G01S 5/12* (2013.01); *G01S 7/4863* (2013.01); *G01S 13/003* (2013.01); *H04B 7/08* (2013.01)

(56) References Cited

U.S. PATENT DOCUMENTS

| | | | | |
|---|---|---|---|---|
| 9,778,340 | B2* | 10/2017 | Mutz | G01S 3/74 |
| 9,958,527 | B2* | 5/2018 | Tuxen | G01S 3/48 |
| 10,768,269 | B2* | 9/2020 | Jahan | G01S 11/02 |
| 2008/0048907 | A1* | 2/2008 | Matsuura | G01S 3/808 342/147 |
| 2009/0267836 | A1* | 10/2009 | Falk | G01S 5/06 342/378 |
| 2011/0140966 | A1 | 6/2011 | Ferreol et al. | |
| 2011/0163905 | A1* | 7/2011 | Denis | G01S 7/412 342/21 |
| 2015/0323642 | A1 | 11/2015 | Mutz et al. | |
| 2018/0348336 | A1* | 12/2018 | Jahan | G01S 5/12 |
| 2019/0064313 | A1* | 2/2019 | Jahan | G01S 5/0273 |
| 2019/0146052 | A1* | 5/2019 | Chiu | H04B 7/024 342/146 |

* cited by examiner

METHOD FOR LOCATING ELECTROMAGNETIC PULSE EMISSION SOURCES IN AN ENVIRONMENT INCLUDING REFLECTORS

The present invention relates to a method for locating at least two sources emitting electromagnetic pulses in an environment, the environment comprising at least two reflectors, the method comprising the following steps:

receiving, by a detector, for each source to be located, for an operating duration of the detector, at least one same emitted pulse, received on the one hand directly from said source and received on the other hand by reflection on one of the reflectors, measuring the arrival direction, the arrival date and at least one invariant characteristic of each received pulse.

The location of a source consists of determining the direction and distance of the source relative to a reference point. Such a location is generally based on a multi-offset principle consisting of observing the source from different angles.

To locate a source, one known method, using the principle of triangulation, consists of measuring the direction of arrival of the pulses emitted by the source using several detectors, delocalized from one another. Triangulation is a technique making it possible to determine the position of a point by measuring the angles between this point and other reference points whose position is known.

However, such a method requires using a network of detectors, and therefore necessarily a coordination system for the detectors of the network, which, aside from the cost related to the number of detectors, rules out the possibility of working with a single detector.

A location method has also been developed consisting of arranging a single detector on a carrier having a relatively high movement speed with respect to the source to be located. Such a relative movement makes it possible to obtain a set of arrival directions over time, the meeting point of which is where the source is located.

However, obtaining a relative movement requires a particularly swift carrier relative to the sources to be located, which makes the method unsuitable in the case of a moving source.

Another known method is based on measuring differences in passage times of antenna beams (DPTAB).

Nevertheless, such measurements assume knowledge of the rotation speed of the antenna beam and therefore the performance of circular sweeping, which involves a relatively slow acquisition.

It is also known to use the time difference of arrival (abbreviated TDOA) of a same signal arriving at two different reception points to locate a source. Such a time difference makes it possible to determine the geometric place where the source is located.

However, here again, at least two detectors are necessary, which rules out the possibility of working with a single detector.

Methods combining TDOA and DPTAB measurements from a single detector are also known.

Conversely, as previously explained, DPTAB measurements require circular sweeping, which is both slow and uncertain.

There is therefore a need for a method for locating sources from a single detector that is quasi-static relative to the sources to be located.

To that end, the invention relates to a location method of the aforementioned type, wherein the method further comprises the following steps:

identification, among the received pulses, of the pulses received directly and the pulses received by reflection, grouping by pairs of pulses received directly with pulses received by reflection, the pulses of each pair having the same invariant characteristics and different directions of arrival, calculating, for each pair, the difference between the date of arrival of the pulse received by reflection relative to the date of arrival of the pulse received directly, and determining the distance of each source from the detector from calculated differences in dates of arrival and from the directions of arrival of the pulses of each pair.

According to specific embodiments, the location method comprises one or more of the following features, considered alone or according to any technically possible combinations:

the operating duration is made up of time brackets with identical durations, the method comprising defining a sliding duration at least equal to the duration of a time bracket, the identification and grouping steps being carried out over a sliding duration, the pulses of each pair belonging to a same time bracket.

the method further comprises, for each time bracket, a step for sorting the received pulses based on the direction of arrival and on the invariant characteristics of each pulse to obtain sub-series of pulses, the pulses of each sub-series having equal directions of arrival and equal invariant characteristics, the pulses of each sub-series being grouped together in a same pair during the grouping step.

the measuring step further comprises the determination, on the successive sub-series of each sliding duration, of the maximum power from among the powers of the pulses of the sub-series having equal directions of arrival, equal invariant characteristics and belonging to a same sliding duration, the pulses received directly and the pulses received by reflection being identified, for each sub-series of pulses, by comparing the maximum power determined for said sub-series to at least two thresholds.

the pulses of the sub-series associated with said maximum power are identified as received directly when the maximum power is greater than or equal to a first threshold and the pulses of the sub-series associated with said maximum power are identified as received by reflection when the maximum power is strictly below a second threshold, the second threshold being less than or equal to the first threshold.

the determination step comprises gathering pairs over predetermined durations to form groups of two pairs, three pairs or four pairs, the number of pairs per group being equal to the number of different directions of arrival corresponding to the pulses received over the predetermined duration, the distance from each source to the detector being determined from differences in dates of arrival calculated for the pairs of each group and directions arrival of the pulses of the pairs of each group, each group of two pairs comprising:

a first pair of pulses of invariant characteristics equal to a first invariant characteristic, of different directions of arrival, and a second pair of pulses of invariant characteristics equal to a second invariant characteristic and with same different directions of arrival, each group of three pairs comprising:

a first pair of pulses of invariant characteristics equal to a first invariant characteristic, with directions of arrival respectively equal to a first and second direction of arrival different from one another, a second pair of pulses of invariant characteristics equal to the first invariant characteristic, with directions of arrival respectively equal to the first and a third direction of arrival, the third direction of arrival being different from the first and second directions of arrival, and a third pair of pulses of invariant characteristics equal to a second invariant characteristic different from the first invariant characteristic, with directions of arrival respectively equal to the second and third directions of arrival, each group of four pairs comprising:

a first pair of pulses of invariant characteristics equal to a first invariant characteristic, with directions of arrival respectively equal to a first and second direction of arrival different from one another, a second pair of pulses of invariant characteristics equal to the first invariant characteristic, with directions of arrival respectively equal to the first and a third direction of arrival, the third direction of arrival being different from the first and second directions of arrival, a third pair of pulses of invariant characteristics equal to a second invariant characteristic different from the first invariant characteristic, with directions of arrival respectively equal to the third and a fourth direction of arrival, the fourth direction of arrival being different from the first, second and third directions of arrival, and a fourth pair of pulses of invariant characteristics equal to the second invariant characteristic, with directions of arrival respectively equal to the third and fourth directions of arrival.

each group makes it possible to determine the respective distances of two of the sources to be located from the detector, said distances being calculated:

for each group of two pairs of pulses, from the following equations:

$$\begin{cases} d_1 = \dfrac{\Delta_{S_1/E_2}^2 + 2\Delta_{S_1/E_1} \cdot d_2}{2\Delta_{S_1/E_2} + 2d_2(1 - \cos(\alpha_{E_2 S_1}))} \\ d_2 = \dfrac{\Delta_{S_2/E_1}^2 + 2\Delta_{S_2/E_1} \cdot d_1}{2\Delta_{S_2/E_1} + 2d_1(1 - \cos(\alpha_{E_1 S_2}))} \end{cases}$$

for each group of three pairs of pulses, from the following equations:

$$\begin{cases} \dfrac{\Delta_{S_1/E_1}^2 + 2\Delta_{S_1/E_1} \cdot d_1}{2\Delta_{S_1/E_1} + 2d_1(1 - \cos(\alpha_{E_1 S_1}))} = \dfrac{\Delta_{S_1/E_2}^2 + 2\Delta_{S_1/E_2} \cdot d_2}{2\Delta_{S_1/E_2} + 2d_2(1 - \cos(\alpha_{E_2 S_1}))} \\ d_2 = \dfrac{\Delta_{S_2/E_1}^2 + 2\Delta_{S_2/E_1} \cdot d_1}{2\Delta_{S_2/E_1} + 2d_1(1 - \cos(\alpha_{E_1 S_2}))} \end{cases}$$

or $$\begin{cases} d_1 = \dfrac{\Delta_{S_1/E_2}^2 + 2\Delta_{S_1/E_1} \cdot d_2}{2\Delta_{S_1/E_2} + 2d_2(1 - \cos(\alpha_{E_2 S_1}))} \\ \dfrac{\Delta_{S_2/E_1}^2 + 2\Delta_{S_2/E_1} \cdot d_1}{2\Delta_{S_2/E_1} + 2d_1(1 - \cos(\alpha_{E_1 S_2}))} = \dfrac{\Delta_{S_2/E_2}^2 + 2\Delta_{S_2/E_2} \cdot d_2}{2\Delta_{S_2/E_2} + 2d_2(1 - \cos(\alpha_{E_2 S_2}))} \end{cases}$$

for each group of four pairs of pulses, from the following equations:

$$\begin{cases} \dfrac{\Delta_{S_1/E_1}^2 + 2\Delta_{S_1/E_1} \cdot d_1}{2\Delta_{S_1/E_1} + 2d_1(1 - \cos(\alpha_{E_1 S_1}))} = \dfrac{\Delta_{S_1/E_2}^2 + 2\Delta_{S_1/E_2} \cdot d_2}{2\Delta_{S_1/E_2} + 2d_2(1 - \cos(\alpha_{E_2 S_1}))} \\ \dfrac{\Delta_{S_2/E_1}^2 + 2\Delta_{S_2/E_1} \cdot d_1}{2\Delta_{S_2/E_1} + 2d_1(1 - \cos(\alpha_{E_1 S_2}))} = \dfrac{\Delta_{S_2/E_2}^2 + 2\Delta_{S_2/E_2} \cdot d_2}{2\Delta_{S_2/E_2} + 2d_2(1 - \cos(\alpha_{E_2 S_2}))} \end{cases}$$

Where $\Delta_{S_1/E_1} = c \cdot \tau_{S_1/E_1}$, $\Delta_{S_2/E_2} = c \cdot \tau_{S_2/E_2}$, $\Delta_{S_1/E_2} = c \cdot \tau_{S_1/E_2}$, $\Delta_{S_2/E_1} = c \cdot \tau_{S_2/E_1}$, $d_1$ is the distance from the first source $E_1$ to the detector, $d_2$ is the distance from the second source $E_2$ to the detector, c is the propagation speed of the electromagnetic waves, $\tau_{S_1/E_1}$ the difference in date of arrival among the pulses received by reflection on a first reflector relative to the pulses received directly from the first source, $\tau_{S_2/E_2}$ is the difference in date of arrival among the pulses received by reflection on a second reflector relative to the pulses received directly from the second source, $\tau_{S_1/E_2}$ is the difference in date of arrival among the pulses received by reflection on the first reflector relative to the pulses received directly from the second source, $\tau_{S_2/E_1}$ is the difference in date of arrival among the pulses received by reflection on the second reflector relative to the pulses received directly from the first source, $\alpha_{E_2 S_2}$ is the angular deviation between the second source and the second reflector seen from the detector, $\alpha_{E_1 S_1}$ is the angular deviation between the first source and the first reflector seen from the detector, $\alpha_{E_2 S_1}$ is the angular deviation between the second source and the first reflector seen from the detector, and $\alpha_{E_1 S_2}$ is the angular deviation between the second source and the first reflector seen from the detector.

the determination step comprises calculating a histogram, for each pair, from differences in dates of arrival calculated for said pair and determining a main lag of the pulses received by reflection relative to the pulses received directly from the calculated histogram, the differences in date of arrival of the preceding equations respectively being equal to one of the determined main lags.

the invariant characteristics of each pulse comprise at least one of the features from among: the width of the pulse, the carrier frequency of the pulse and the intentional intra-pulse modulation.

The invention also relates to a location detector for at least two electromagnetic pulse emission sources in an environment, the environment comprising at least two reflectors, the detector being able to carry out the steps of the method as defined above.

Figure 2:
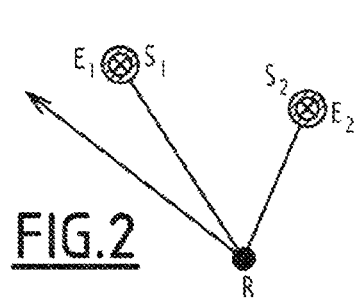
Figure 3:
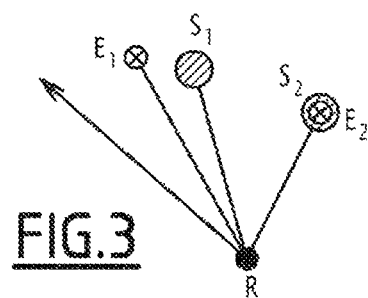
Figure 4:
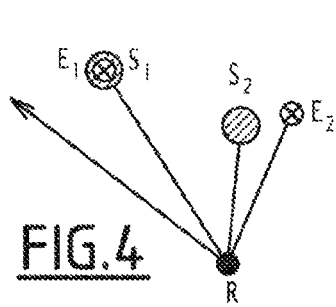
Figure 5:
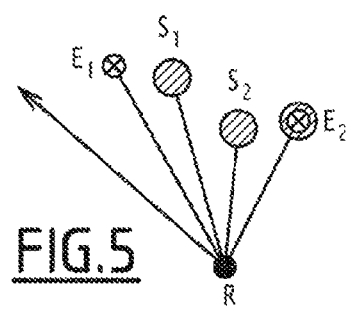
Figure 6:
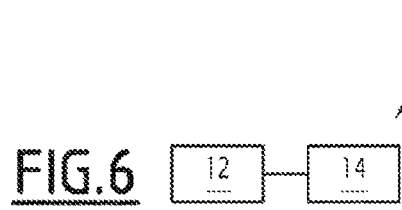
Figure 7:
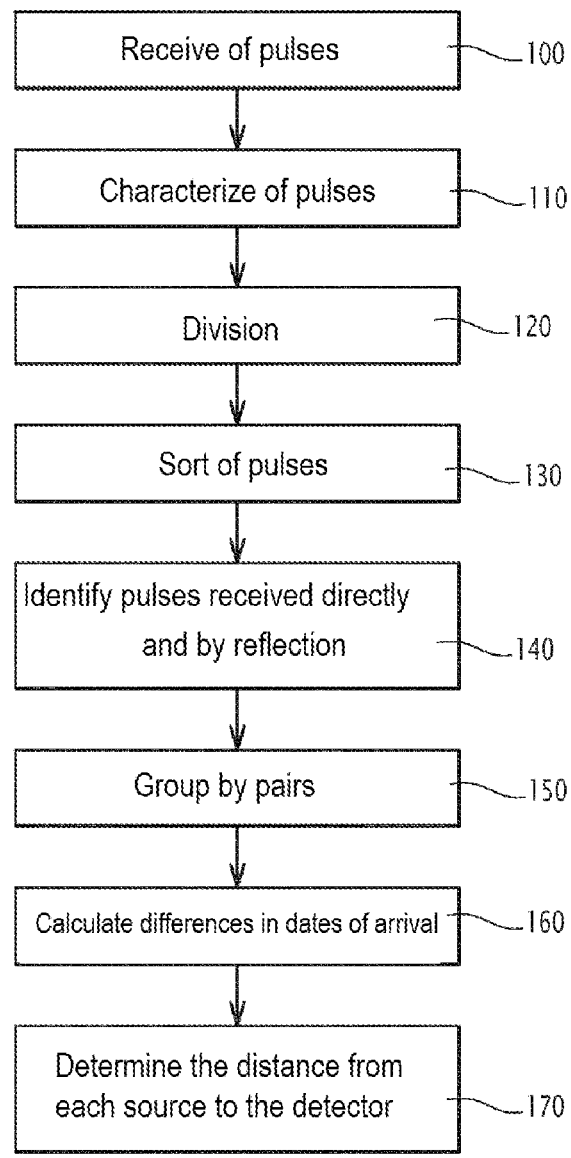

Other features and advantages of the invention will appear upon reading the following description of embodiments of the invention, solely as an example and done in reference to the drawings, which are:

FIG. 1, a schematic view of one example of a source to be located, a reflector and a detector configured to locate the source, FIG. 2, a schematic view of an example of a first configuration of two sources to be located and two reflectors, each source being co-located with a reflector, FIG. 3, a schematic view of an example of a second configuration of two sources to be located and two reflectors, one of the sources being co-located with a reflector, FIG. 4, a schematic view of another example of a second configuration of two sources to be located and two reflectors, FIG. 5, a schematic view of an example of a third configuration of two sources to be located and two reflectors, the sources not being co-located with the reflectors, FIG. 6, a schematic and functional view of the detector of FIG. 1, and FIG. 7, a flowchart of one example implementation of a method for locating sources.

One general principle for implementing the invention is described hereinafter, based on FIG. 1.

FIG. 1 illustrates an emission source $E_i$, a reflector $S_k$ and a detector R, forming the three points of a bistatic triangle $E_i R S_k$. The distance $E_i R$ between the source $E_i$ and the detector R is denoted $d_i$ in FIG. 1 and in the rest of the description.

Each emission source $E_i$ is for example a radar emission source, i.e., a modulated electromagnetic emission source, and more particularly pulse-modulated. Each source $E_i$ is for example arranged at sea on ships delocalized from one another.

One aim of the invention is to locate said sources $E_i$ using a single radar detector R placed at a distance from the sources $E_i$, as illustrated by FIG. 1.

The radar detector R receives the signal $x_{E_i}$ corresponding to the pulse emitted by the source $E_i$ directly, i.e., after having traveled the path $E_i R$. This signal is characterized by characteristics $a_{E_i}$, a date of arrival $t_{E_i}$ and a direction of arrival $\theta_{E_i}$ measured by the detector R.

The radar detector R also receives the signal $x_{S_k/E_i}$ corresponding to the same pulse emitted by the source $E_i$ and reflected on the reflector $S_k$, i.e., after having traveled the path $E_i S_k + S_k R$. This signal is characterized by characteristics $a_{S_k/E_i}$, a date of arrival $t_{S_k/E_i}$ and a direction of arrival $\theta_{S_k}$ measured by the detector R.

Thus, for the source $E_i$ and the reflector $S_k$, the detector R receives the two signals: $x_{E_i}$ ($a_{E_i}$, $\theta_{E_i}$, $t_{E_i}$) and $x_{S_k/E_i}$ ($a_{D_k/E_i}$, $t_{S_k/E_i}$, $\theta_{S_k}$).

From the signals $x_{E_i}$ ($a_{E_i}$, $\theta_{E_i}$, $t_{E_i}$) and $x_{S_k/E_i}$ ($a_{S_k/E_i}$, $t_{S_k/E_i}$, $\theta_{S_k}$), the detector R deduces the difference in time of arrival $\tau_{S_k/E_i}$ and the difference in direction of arrival $\alpha_{E_i S_k}$ between the pulse received directly and the pulse received by reflection from a same emission, or therefore: $\tau_{S_k/E_i} = t_{S_k/E_i} - t_{E_i}$ and $\alpha_{E_i S_k} = \theta_{E_i} - \theta_{S_k}$.

The difference in paths $E_i S_k + S_k R - d_i = c \cdot \tau_{S_k/E_i}$ is called the associated bistatic distance and is denoted $\Delta_{S_k/E_i}$. Such an expression makes it possible to obtain the following expression of the distance $E_i S_k$ between the source $E_i$ and the reflector $S_k$:

$$E_i S_k = \Delta_{S_k/E_i} + d_i - S_k R \qquad (1)$$

The application of the cosine theorem to the triangle $E_i R S_k$ makes it possible to write the following equation:

$$E_i S_k^2 = S_k R^2 + d_i^2 - 2 d_i \cdot S_k R \cdot \cos(\alpha_{E_i S_k}) \qquad (2)$$

By eliminating the term $E_i S_k$ from expressions (1) and (2), the following expression of the distance $S_k R$ between the reflector $S_k$ and the detector R is obtained:

$$S_k R = \frac{\Delta_{S_k/E_i}^2 + 2\Delta_{S_k/E_i} \cdot d_i}{2\Delta_{S_k/E_i} + 2d_i(1 - \cos(\alpha_{E_i S_k}))} \qquad (3)$$

If a single detector R is used, the resolution of the localization problem from direction of arrival and time of arrival measurements is based on the fact that the studied zone comprises at least two sources $E_i$ not colocalized with one another, $E_1$ and $E_2$, and two reflectors $S_k$ also not colocalized with one another, $S_1$ and $S_2$. One or several colocalizations of a source $E_i$ with a reflector $S_k$ are, however, acceptable. Two elements are considered to be "colocalized" when they are combined.

From two sources and two reflectors, there are therefore four possible configurations. These configurations are illustrated by FIGS. 2 to 5.

In particular, FIG. 2 illustrates a first configuration in which the two sources are not colocalized and each source is colocalized with a reflector. The first configuration of FIG. 2 comprises two non-degenerated bistatic triangles $E_1 R S_2$ and $E_2 R S_1$ and two degenerated bistatic triangles $E_1 R S_1$ and $E_2 R S_2$. A triangle is said to be degenerated when it can be summarized by one segment.

FIGS. 3 and 4 each illustrate a second configuration in which the two sources are not colocalized with one another and a single source is colocalized with a reflector. The second configuration of FIG. 3 comprises three non-degenerated bistatic triangles $E_1 R S_1$, $E_1 R S_2$ and $E_2 R S_1$ and one degenerated bistatic triangle $E_2 R S_2$. The second configuration of FIG. 4 comprises three non-degenerated bistatic triangles $E_2 R S_2$, $E_1 R S_2$ and $E_2 R S_1$ and one degenerated bistatic triangle $E_1 R S_1$.

FIG. 5 illustrates a third configuration in which the sources and the reflectors are not colocalized with one another. The third configuration of FIG. 5 comprises four non-degenerated bistatic triangles $E_1 R S_1$, $E_2 R S_2$, $E_1 R S_2$ and $E_2 R S_1$.

The application of relationship (3) to each possible bistatic triangle provides four expressions:

$$\text{Triangle } E_1 R S_1 \Rightarrow S_1 R = \frac{\Delta_{S_1/E_1}^2 + 2\Delta_{S_1/E_1} \cdot d_1}{2\Delta_{S_1/E_1} + 2d_1(1 - \cos(\alpha_{E_1 S_1}))} \qquad (4.1)$$

$$\text{Triangle } E_1 R S_2 \Rightarrow S_2 R = \frac{\Delta_{S_2/E_1}^2 + 2\Delta_{S_2/E_1} \cdot d_1}{2\Delta_{S_2/E_1} + 2d_1(1 - \cos(\alpha_{E_1 S_2}))} \qquad (4.2)$$

$$\text{Triangle } E_2 R S_1 \Rightarrow S_1 R = \frac{\Delta_{S_1/E_2}^2 + 2\Delta_{S_1/E_2} \cdot d_2}{2\Delta_{S_1/E_2} + 2d_2(1 - \cos(\alpha_{E_2 S_1}))} \qquad (4.3)$$

$$\text{Triangle } E_2 R S_2 \Rightarrow S_2 R = \frac{\Delta_{S_2/E_2}^2 + 2\Delta_{S_2/E_2} \cdot d_2}{2\Delta_{S_2/E_2} + 2d_2(1 - \cos(\alpha_{E_2 S_2}))} \qquad (4.4)$$

Expressions (4.1) to (4.4) only have a complete meaning for the third configuration. Indeed, the expressions relative to the degenerated bistatic triangles are meaningless due to the nil values corresponding to the measurements of the bistatic distance $\Delta_{S_k/E_i}$ and the difference in angle of arrival between the source and the reflector $\alpha_{E_i S_k}$.

In the case of the third configuration, the equality of expressions (4.1) and (4.3) and that of expressions (4.2) and (4.4), makes it possible to obtain the following equations:

$$S_1 R = \frac{\Delta_{S_1/E_1}^2 + 2\Delta_{S_1/E_1} \cdot d_1}{2\Delta_{S_1/E_1} + 2d_1(1 - \cos(\alpha_{E_1 S_1}))} = \qquad (5.1)$$

$$\frac{\Delta_{S_1/E_2}^2 + 2\Delta_{S_1/E_2} \cdot d_2}{2\Delta_{S_1/E_2} + 2d_2(1 - \cos(\alpha_{E_2 S_1}))} \text{ and}$$

-continued $$S_2 R = \frac{\Delta^2_{S_2/E_1} + 2\Delta_{S_2/E_1} \cdot d_1}{2\Delta_{S_2/E_1} + 2d_1(1 - \cos(\alpha_{E_1 S_2}))} = \frac{\Delta^2_{S_2/E_2} + 2\Delta_{S_2/E_2} \cdot d_2}{2\Delta_{S_2/E_2} + 2d_2(1 - \cos(\alpha_{E_2 S_2}))} \quad (5.2)$$

Where
$\Delta_{S_1/E_1} = c \cdot \tau_{S_1/E_1}$, $\Delta_{S_2/E_2} = c \cdot \tau_{S_2/E_2}$, $\Delta_{S_1/E_2} = c \cdot \tau_{S_1/E_2}$, $\Delta_{S_2/E_1} = c \cdot \tau_{S_2/E_1}$, $d_1$ is the distance from the first source $E_1$ to the detector R, $d_2$ is the distance from the second source $E_2$ to the detector R, c is the propagation speed of the electromagnetic waves, $\tau_{S_1/E_1}$ is the difference in date of arrival among the pulses received by reflection on a first reflector relative to the pulses received directly from the first source, $\tau_{S_2/E_2}$ is the difference in date of arrival among the pulses received by reflection on a second reflector relative to the pulses received directly from the second source, $\tau_{S_1/E_2}$ is the difference in date of arrival among the pulses received by reflection on the first reflector relative to the pulses received directly from the second source, $\tau_{S_2/E_1}$ is the difference in date of arrival among the pulses received by reflection on the second reflector relative to the pulses received directly from the first source, $\alpha_{E_2 S_2}$ is the angular deviation between the second source and the second reflector seen from the detector, $\alpha_{E_1 S_1}$ is the angular deviation between the first source and the first reflector seen from the detector, $\alpha_{E_2 S_1}$ is the angular deviation between the second source and the first reflector seen from the detector, and $\alpha_{E_1 S_2}$ is the angular deviation between the second source and the first reflector seen from the detector.

Expressions (5.1) and (5.2) make it possible to obtain a system of two equations of the following type:

$$\begin{cases} b_{11} + b_{12} \cdot d_1 + b_{13} \cdot d_2 + b_{14} \cdot d_1 \cdot d_2 = 0 \\ b_{21} + b_{22} \cdot d_1 + b_{23} \cdot d_2 + b_{24} \cdot d_1 \cdot d_2 = 0 \end{cases} \quad (6)$$

In the case of the second configuration of FIG. 3, the preceding expression (5.1) is still valid, but not expression (5.2), since expression (4.4) is meaningless. However, one may note that expression (4.2) is then that of $d_2$, which makes it possible to write:

$$d_2 = S_2 R = \frac{\Delta^2_{S_2/E_1} + 2\Delta_{S_2/E_1} \cdot d_1}{2\Delta_{S_2/E_1} + 2d_1(1 - \cos(\alpha_{E_1 S_2}))} \quad (7)$$

Expressions (5.1) and (7) then make it possible to find system of equations (6).

By symmetry, the second configuration of FIG. 4 arrives at the same system of equations (6).

In the case of the first configuration, expressions (5.1) and (5.2) are not valid because expressions (4.1) and (4.4) are meaningless. However, one may note that expression (7) is applicable and that expression (4.3) is then that of $d_1$, which makes it possible to write:

$$d_1 = S_1 R = \frac{\Delta^2_{S_1/E_2} + 2\Delta_{S_1/E_2} \cdot d_2}{2\Delta_{S_1/E_2} + 2d_2(1 - \cos(\alpha_{E_2 S_1}))} \quad (8)$$

Expressions (7) and (8) then make it possible to find system of equations (6) again.

A single system of equations (6) therefore makes it possible to extract the unknowns $d_1$ and $d_2$, only the coefficients $b_{ij}$ being different from one configuration to the other.

A single processing operation to solve system of equations (6) is therefore carried out by the detector R with coefficients $b_{ij}$ depending on configurations found upon the detection.

The coefficients of system (6) are expressed below as a function of the different configurations:

For the first configuration illustrated in FIG. 2:

$$\begin{cases} b_{11} = \Delta^2_{S_1/E_2} \\ b_{12} = -2\Delta_{S_1/E_2} \\ b_{13} = 2\Delta_{S_1/E_2} \\ b_{14} = -2(1 - \cos(\alpha_{E_2 S_1})) \end{cases} \quad (9.1)$$

and $$\begin{cases} b_{21} = -\Delta^2_{S_2/E_1} \\ b_{22} = -2\Delta_{S_2/E_1} \\ b_{23} = 2\Delta_{S_2/E_1} \\ b_{24} = 2(1 - \cos(\alpha_{E_1 S_2})) \end{cases} \quad (9.2)$$

For the second configuration illustrated in FIG. 3:

$$\begin{cases} b_{11} = 2\, \Delta_{S_1/E_1} \cdot \Delta_{S_1/E_2} (\Delta_{S_1/E_1} - \Delta_{S_1/E_2}) \\ b_{12} = 2\, \Delta_{S_1/E_2} (2\Delta_{S_1/E_1} - \Delta_{S_1/E_2} (1 - \cos(\alpha_{E_1 S_1}))) \\ b_{13} = 2\, \Delta_{S_1/E_1} (-2\Delta_{S_1/E_2} + \Delta_{S_1/E_1} (1 - \cos(\alpha_{E_2 S_1}))) \\ b_{14} = 4\, \Delta_{S_1/E_1} (1 - \cos(\alpha_{E_2 S_1})) - 4\Delta_{S_1/E_2} (1 - \cos(\alpha_{E_1 S_1})) \end{cases} \quad (9.3)$$

and $$\begin{cases} b_{21} = -\Delta^2_{S_2/E_1} \\ b_{22} = -2\Delta_{S_2/E_1} \\ b_{23} = 2\Delta_{S_2/E_1} \\ b_{24} = 2(1 - \cos(\alpha_{E_1 S_2})) \end{cases} \quad (9.2)$$

For the second configuration illustrated in FIG. 4:

$$\begin{cases} b_{11} = \Delta^2_{S_1/E_2} \\ b_{12} = -2\Delta_{S_1/E_2} \\ b_{13} = 2\Delta_{S_1/E_2} \\ b_{14} = -2(1 - \cos(\alpha_{E_2 S_1})) \end{cases} \quad (9.1)$$

and $$\begin{cases} b_{21} = 2\, \Delta_{S_2/E_1} \cdot \Delta_{S_2/E_2} (\Delta_{S_2/E_1} - \Delta_{S_2/E_2}) \\ b_{22} = 2\, \Delta_{S_2/E_2} (2\Delta_{S_2/E_1} - \Delta_{S_2/E_2} (1 - \cos(\alpha_{E_1 S_2}))) \\ b_{23} = 2\, \Delta_{S_2/E_1} (-2\Delta_{S_2/E_2} + \Delta_{S_2/E_1} (1 - \cos(\alpha_{E_2 S_2}))) \\ b_{24} = 4\, \Delta_{S_2/E_1} (1 - \cos(\alpha_{E_2 S_2})) - 4\Delta_{S_2/E_2} (1 - \cos(\alpha_{E_1 S_2})) \end{cases} \quad (9.4)$$

For the third configuration illustrated in FIG. 5:

$$\begin{cases} b_{11} = 2\,\Delta_{S_1/E_1} \cdot \Delta_{S_1/E_2}(\Delta_{S_1/E_1} - \Delta_{S_1/E_2}) \\ b_{12} = 2\,\Delta_{S_1/E_2}(2\Delta_{S_1/E_1} - \Delta_{S_1/E_2}(1 - \cos(\alpha_{E_1 S_1}))) \\ b_{13} = 2\,\Delta_{S_1/E_1}(-2\Delta_{S_1/E_2} + \Delta_{S_1/E_1}(1 - \cos(\alpha_{E_2 S_1}))) \\ b_{14} = 4\,\Delta_{S_1/E_1}(1 - \cos(\alpha_{E_2 S_1})) - 4\Delta_{S_1/E_2}(1 - \cos(\alpha_{E_1 S_1})) \end{cases} \quad (9.3)$$

and $$\begin{cases} b_{21} = 2\,\Delta_{S_2/E_1} \cdot \Delta_{S_2/E_2}(\Delta_{S_2/E_1} - \Delta_{S_2/E_2}) \\ b_{22} = 2\,\Delta_{S_2/E_2}(2\Delta_{S_2/E_1} - \Delta_{S_2/E_2}(1 - \cos(\alpha_{E_1 S_2}))) \\ b_{23} = 2\,\Delta_{S_2/E_1}(-2\Delta_{S_2/E_2} + \Delta_{S_2/E_1}(1 - \cos(\alpha_{E_2 S_2}))) \\ b_{24} = 4\,\Delta_{S_2/E_1}(1 - \cos(\alpha_{E_2 S_2})) - 4\Delta_{S_2/E_2}(1 - \cos(\alpha_{E_1 S_2})) \end{cases} \quad (9.4)$$

From the first equation of system (6), it is for example possible to express, $d_1$ as a function of $d_2$:

$$d_1 = -\frac{b_{11} + b_{13} \cdot d_2}{b_{12} + b_{14} \cdot d_2} \quad (10)$$

Expression (10) introduced into the second equation of system (6) results in a second-degree equation in $d_2$, solved by the detector R:

$$A \cdot d_2^2 + B \cdot d_2 + C = 0 \quad (11)$$

Where:
$A = b_{13} \cdot b_{24} - b_{14} \cdot b_{23}$,
$B = b_{11} \cdot b_{24} - b_{12} \cdot b_{23} + b_{13} \cdot b_{22} - b_{14} \cdot b_{21}$, and
$C = b_{11} \cdot b_{22} - b_{13} \cdot b_{12}$.

The solution of equation (11) is the only positive square root, or:

$$d_2 = \frac{-B \pm \sqrt{B^2 - 4AC}}{2A} > 0 \quad (12)$$

The distance $d_1$ from the first source to the detector R is calculated by the detector R from expression (10) and the value of $d_2$ previously found.

Relationships (4.2) and (4.3) make it possible to calculate the distances from each reflector to the detector $S_1R$ and $S_2R$ for measured values of $\Delta_{S_k/E_i}$ and $\alpha_{E_i S_k}$, and from calculated values of $d_1$ and $d_2$.

Thus, the sources $E_1$ and $E_2$ and the reflectors $S_1$ and $S_2$ have indeed been located in polar coordinates, respectively $(d_1, \theta_{E_1})$, $(d_2, \theta_{E_2})$, $(S_1R, \theta_{S_1})$ and $(S_2R, \theta_{S_2})$.

The detector R for locating sources $E_i$ emitting electromagnetic pulses, working on the principle previously described, is functionally illustrated by FIG. 6.

The detector R is a radar detector.

The detector R is quasi-static relative to the sources $E_i$ to be located, i.e., the detector R has, at most, a relatively low speed relative to the sources $E_i$ to be located, such that the geometric evolutions, relative to the bistatic triangles $E_1RS_1$, $E_2RS_2$, $E_1RS_2$ and $E_2 RS_1$ are inferior enough to the desired precision not to affect it.

The detector R comprises a receiving module 12 and a computer 14.

The receiving module 12 comprises an array of goniometry antennas forming a single detector considered to be periodic, a set of reception chains associated with the antenna array and processing functions making it possible to measure characteristics of the received pulses.

The characteristics of the pulses measured by the receiving module 12 are for example the direction of arrival of the pulses, the carrier frequency of the pulses, the width of the pulses, the date of arrival of the pulses, the intentional modulation on pulse, or the power of the pulses.

The computer 14 interacts with the receiving module 12.

The computer 14 for example comprises a processor, a memory and a data processing unit. The data processing unit is configured to carry out, in interaction with a computer program product, able to be loaded in the data processing unit, a location method that will be described in more detail in the rest of the description.

An example of operation of the detector R is now described in reference to FIG. 7, which schematically shows a flowchart of the implementation of a method for locating sources $E_1, \ldots, E_n$ emitting electromagnetic pulses.

In the rest of the description, the term "equal" means "equal to within an allowance". The selected allowance is related to the measuring precisions, the measuring signal-to-noise ratio and the frequency of the signals received on the detector R. The chosen allowance is for example ±5 percent (%).

For each source $E_i$ to be located, the determination method initially comprises a step 100 for reception by the detector R of at least one emitted pulse, on the one hand received directly, i.e., along the path going directly from the source $E_i$ to the detector R, and on the other hand received in its reflected form, i.e., after reflection on a reflector $S_k$. Only the difference in geometric paths, which causes different dates of arrival, and the quality of the reflection make it possible to differentiate the pulse received directly from the pulse received by reflection when these received pulses come from the same emission.

The pulses are received by the detector R during the operating duration of the detector R.

Next, the location method comprises a step 110 for measuring, by the detector R, the direction of arrival $\theta_k$, the date of arrival $t_1, \ldots, t_n$ on the detector R and at least one invariant characteristic $CTI_j$ of each received pulse.

In the embodiment illustrated in FIG. 7, the measuring step 110 also comprises measuring the power p of each received pulse.

The invariant characteristics $CTI_j$ of each pulse comprise at least one of the features from among: the width of the pulse, the carrier frequency of the pulse and the intentional intra-pulse modulation.

The location method comprises a step 120 for dividing the operating duration into time brackets $\Delta t_i$ with a same duration. The method also comprises defining a sliding duration $\Delta T$ at least equal to the duration of a time bracket $\Delta t_j$.

The duration of each time bracket $\Delta t_i$ is related to the maximum illumination duration at 3 dB of the readers. For example, the duration of each time bracket is comprised between 10 milliseconds (ms) and 100 ms.

The location method advantageously comprises, for each time bracket $\Delta t_i$, a step 130 for sorting pulses received during the time bracket $\Delta t_i$, based on the direction of arrival $\theta_k$ and at least one invariant characteristic $CTI_j$ chosen from among the measured invariant characteristic(s) of each pulse. At the end of the sorting step 130, sub-series of pulses $$\{l(CTI_j, p, \theta_k, t, \ldots)\}_{\Delta t_i}$$

are obtained.

The pulses of each sub-series $$\{I(CTI_j, p, \theta_k, t, \ldots)\}_{\Delta t_l}$$

have equal directions of arrival $\theta_k$, equal invariant characteristics $CTI_j$ and belong to the same time bracket $\Delta t_i$. As a result, each sub-series is characterized by a time bracket $\Delta t_i$, a direction of arrival $\theta_k$ and at least one invariant characteristic $CTI_j$.

The method comprises a step 140 for identification, among the received pulses, of the pulses received directly and the pulses received by reflection.

In the embodiment of FIG. 7, the identification step 140 comprises a phase for creating sets $$\left\{\{I(CTI_{j_x}, p, \Theta_{k_y}, t, \ldots)\}_{\Delta t_{z1}}, \{I(CTI_{j_x}, p, \Theta_{k_y}, t, \ldots)\}_{\Delta t_{z2}}, \ldots\right\}_{\Delta T}$$

of sub-series. The sub-series of each set $$\left\{\{I(CTI_{j_x}, p, \Theta_{k_y}, t, \ldots)\}_{\Delta t_{z1}}, \{I(CTI_{j_x}, p, \Theta_{k_y}, t, \ldots)\}_{\Delta t_{z2}}, \ldots\right\}_{\Delta T}$$

are taken over a same sliding duration $\Delta T$, have equal directions of arrival $\theta_k$ and equal invariant characteristics $CTI_j$.

The identification step 140 also comprises, for each set $$\left\{\{I(CTI_{j_x}, p, \Theta_{k_y}, t, \ldots)\}_{\Delta t_{z1}}, \{I(CTI_{j_x}, p, \Theta_{k_y}, t, \ldots)\}_{\Delta t_{z2}}, \ldots\right\}_{\Delta T}$$

of sub-series, a phase for determining the maximum power from among the powers of the pulses of the considered set.

The identification step 140 further comprises, for each set $$\left\{\{I(CTI_{j_x}, p, \Theta_{k_y}, t, \ldots)\}_{\Delta t_{z1}}, \{I(CTI_{j_x}, p, \Theta_{k_y}, t, \ldots)\}_{\Delta t_{z2}}, \ldots\right\}_{\Delta T},$$

a phase for identifying pulses received directly and pulses received by reflection.

The identification step 140 is for example carried out by comparing the determined maximum power relative to two thresholds.

In this case, when the determined maximum power for the considered set $$\left\{\{I(CTI_{j_x}, p, \Theta_{k_y}, t, \ldots)\}_{\Delta t_{z1}}, \{I(CTI_{j_x}, p, \Theta_{k_y}, t, \ldots)\}_{\Delta t_{z2}}, \ldots\right\}_{\Delta T}$$

is greater than or equal to a first threshold, the pulses of the sub-series of the set are identified as received directly. The sub-series of the corresponding set are then called direct sub-series and denoted $$\{I(CTI_j, p, \theta_k, t, \ldots)\}_{\Delta t_l, E}.$$

The first threshold is for example chosen based on the radiated power of the sources $E_i$. The radiated power of a source (abbreviated EIRP) is the product of the power injected in the antenna(s) of the source by the gain of said antenna(s) of the source.

When the determined maximum power for the considered set $$\left\{\{I(CTI_{j_x}, p, \theta_{k_y}, t, \ldots)\}_{\Delta t_{z1}}, \{I(CTI_{j_x}, p, \theta_{k_y}, t, \ldots)\}_{\Delta t_{z2}}, \ldots\right\}_{\Delta T}$$

is strictly less than a second threshold, the pulses of the sub-series of the set are identified as received by reflection. The sub-series of the corresponding set are then called reflected sub-series and denoted $\{I(CTI_j, p, \theta_k, t, \ldots)\}_{\Delta t_l, S}$. The second threshold is less than or equal to the first threshold. The second threshold is for example chosen based on the radiated power of the sources $E_i$ and equivalent radar surfaces of the reflectors $S_k$.

The method further comprises a step 150 for grouping by pair of direct sub-series $$\{I(CTI_j, p, \theta_k, t, \ldots)\}_{\Delta t_l, E}$$

with reflect sub-series having the same invariant characteristics $$\{I(CTI_j, p, \theta_k, t, \ldots)\}_{\Delta t_l, S}$$

and different directions of arrival $CTI_j$.

The grouping step 150 comprises a phase for forming, from previously formed sets $$\left\{\{I(CTI_{j_x}, p, \Theta_{k_y}, t, \ldots)\}_{\Delta t_{z1}}, \{I(CTI_{j_x}, p, \Theta_{k_y}, t, \ldots)\}_{\Delta t_{z2}}, \ldots\right\}_{\Delta T},$$

extended sets of same invariant characteristics $CTI_j$ and different directions of arrival $\theta_k$, comprising at least one emitter and one reflector, or these extended sets:

$$\left\{\{I(CTI_{j_x}, p, \Theta_{k_{y1}}, t, \ldots)\}_{\Delta t_{z11}, E}, \{I(CTI_{j_x}, p, \Theta_{k_{y1}}, t, \ldots)\}_{\Delta t_{z21}, S}, \ldots\right\}_{\Delta T},$$

$$\left\{\{I(CTI_{j_x}, p, \Theta_{k_{y2}}, t, \ldots)\}_{\Delta t_{z12}, E}, \{I(CTI_{j_x}, p, \Theta_{k_{y2}}, t, \ldots)\}_{\Delta t_{z22}, S}, \ldots\right\}_{\Delta T},$$

The grouping step 150 also comprises a phase for grouping, by pairs, direct sub-series with reflected sub-series. The pulses of each pair have the same invariant characteristics $CTI_j$, different directions of arrival, and belong to a same time bracket $\Delta t_i$.

The grouping step 150 also comprises a step for gathering pairs of each extended set to form groups of two pairs, three pairs or four different pairs. The number of pairs per group is equal to the number of different directions of arrival of the pulses of the corresponding extended set.

Each group groups together the pulses corresponding to one of the four geometric configurations of FIGS. 2 to 5.

In particular, for the first configuration corresponding to FIG. 2, the pulses come from two different directions of arrival; as a result, groups of two different pairs of sub-series are formed. Each group of two pairs comprises:
  a first pair of sub-series $$\{I(CTI_{j_{x1}}, \Theta_{k_{y1}}, t, \ldots)\}_{\Delta t_{l_{z1}}, E} \cup \{I(CTI_{j_{x1}}, \Theta_{k_{y2}}, t, \ldots)\}_{\Delta t_{l_{z1}}, S},$$

the pulses of which have invariant characteristics equal to a first invariant characteristic ($CTI_{j_{x1}}$) and different directions of arrival ($\Theta_{k_{y1}}$, $\Theta_{k_{y2}}$), and
  a second pair of sub-series $$\{I(CTI_{j_{x2}}, \Theta_{k_{y1}}, t, \ldots)\}_{\Delta t_{l_{z2}}, S} \cup \{I(CTI_{j_{x2}}, \Theta_{k_{y2}}, t, \ldots)\}_{\Delta t_{l_{z2}}, E},$$

the pulses of which have invariant characteristics equal to a second invariant characteristic ($CTI_{j_{x2}}$) and have the same different directions of arrival ($\Theta_{k_{y1}}$, $\Theta_{k_{y2}}$).

For the second configuration corresponding to FIGS. 3 and 4, the pulses come from three different directions of arrival; consequently, groups of three different pairs of sub-series are formed. Each group of three pairs comprises:
  a first pair of sub-series $$\{I(CTI_{j_{x1}}, \Theta_{k_{y1}}, t, \ldots)\}_{\Delta t_{l_{z1}}, E} \cup \{I(CTI_{j_{x1}}, \Theta_{k_{y3}}, t, \ldots)\}_{\Delta t_{l_{z1}}, S},$$

the pulses of which have invariant characteristics equal to a first invariant characteristic ($CTI_{j_{x1}}$) and which have directions of arrival respectively equal to a first and second direction of arrival ($\Theta_{k_{y1}}$, $\Theta_{k_{y2}}$) different from one another,
  a second pair of sub-series $$\{I(CTI_{j_{x1}}, \Theta_{k_{y1}}, t, \ldots)\}_{\Delta t_{l_{z2}}, E} \cup \{I(CTI_{j_{x1}}, \Theta_{k_{y2}}, t, \ldots)\}_{\Delta t_{l_{z2}}, S},$$

the pulses of which have invariant characteristics equal to the first invariant characteristic ($CTI_{j_{x1}}$) and directions of arrival respectively equal to the first and a third direction of arrival ($\Theta_{k_{y1}}$, $\Theta_{k_{y2}}$), the third direction of arrival being different from the first and second directions of arrival,
  a third pair of sub-series $$\{I(CTI_{j_{x2}}, \Theta_{k_{y2}}, t, \ldots)\}_{\Delta t_{l_{z3}}, E} \cup \{I(CTI_{j_{x2}}, \Theta_{k_{y3}}, t, \ldots)\}_{\Delta t_{l_{z3}}, S},$$

the pulses of which have invariant characteristics equal to a second invariant characteristic ($CTI_{j_{x2}}$) different from the first invariant characteristic and directions of arrival respectively equal to the second and third directions of arrival ($\Theta_{k_{y2}}$, $\Theta_{k_{y3}}$).

For the third configuration corresponding to FIG. 5, the pulses come from four different directions of arrival; as a result, groups of four different pairs of sub-series are formed. Each group of four pairs comprises:
  a first pair of sub-series $$\{I(CTI_{j_{x1}}, \Theta_{k_{y1}}, t, \ldots)\}_{\Delta t_{l_{z1}}, E} \cup \{I(CTI_{j_{x1}}, \Theta_{k_{y3}}, t, \ldots)\}_{\Delta t_{l_{z1}}, S},$$

the pulses of which have invariant characteristics equal to a first invariant characteristic ($CTI_{j_{x1}}$) and which have directions of arrival respectively equal to a first and second direction of arrival ($\Theta_{k_{y1}}$, $\Theta_{k_{y3}}$), different from one another,
  a second pair of sub-series $$\{I(CTI_{j_{x1}}, \Theta_{k_{y1}}, t, \ldots)\}_{\Delta t_{l_{z2}}, E} \cup \{I(CTI_{j_{x1}}, \Theta_{k_{y4}}, t, \ldots)\}_{\Delta t_{l_{z2}}, S},$$

the pulses of which have invariant characteristics equal to the first invariant characteristic ($CTI_{j_{x1}}$) and directions of arrival respectively equal to the first and a third direction of arrival ($\Theta_{k_{y1}}$, $\Theta_{k_{y4}}$), the third direction of arrival being different from the first and second directions of arrival,
  a third pair of sub-series $$\{I(CTI_{j_{x2}}, \Theta_{k_{y2}}, t, \ldots)\}_{\Delta t_{l_{z3}}, E} \cup \{I(CTI_{j_{x2}}, \Theta_{k_{y3}}, t, \ldots)\}_{\Delta t_{l_{z3}}, S},$$

the pulses of which have invariant characteristics equal to a second invariant characteristic ($CTI_{j_{x2}}$) different from the first invariant characteristic and directions of arrival respectively equal to the third and a fourth direction of arrival ($\Theta_{k_{y2}}$, $\Theta_{k_{y3}}$), the fourth direction of arrival being different from the first, second and third directions of arrival, and
  a fourth pair of sub-series $$\{I(CTI_{j_{x2}}, \Theta_{k_{y2}}, t, \ldots)\}_{\Delta t_{l_{z4}}, E} \cup \{I(CTI_{j_{x2}}, \Theta_{k_{y4}}, t, \ldots)\}_{\Delta t_{l_{z4}}, S},$$

the pulses of which have invariant characteristics equal to the second invariant characteristic ($CTI_{j_{x2}}$) and directions of arrival respectively equal to the third and fourth directions of arrival ($\Theta_{k_{y2}}$, $\Theta_{k_{y4}}$).

The method also comprises a step 160 for calculating, for each pair of sub-series, the difference between the date of arrival of the pulses received by reflection relative to the date of arrival of the pulses received directly. Such differences in dates of arrival result from differences in geometric paths between the received direct pulses and the received reflected pulses derived from the same emitted pulses.

The method further comprises a step 170 for determining the distance $d_i$ of each source from $E_i$ the detector R from calculated differences in dates of arrival of the pulses of each pair.

The determination step 170 comprises a phase calculating a histogram, for each pair, from differences in dates of arrival calculated for said pair and determining a main lag $\tau_{S_y/E_y}$ from the pulses received by reflection relative to the pulses received directly from the calculated histogram.

Each main lag $\tau_{S_y/E_y}$ is allocated to its pair $$\{I(CTI_{j_x}, \Theta_{k_y}, t, \ldots)\}_{\Delta t_{l_z}, E} \cup \{I(CTI_{j_x}, \Theta_{k_y}, t, \ldots)\}_{\Delta t_{l_z}, S},$$

which can then be symbolically denoted as follows: $(CTI_{j_c}, \Theta_{k_y}, \Theta_{k_{y'}}, \Delta t_{l_z}, \tau_{S_{y'}/E_y})$.

Preferably, the determination step 170 also comprises a phase for comparing values of each determined main lag $\tau_{S_{y'}/E_y}$ relative to a range of reference values. The range of reference values is for example chosen based on geometric considerations, related to the the directions of arrival and plausible distance hypotheses in the ranges of interest. The range of reference values for example extends, broadly speaking, between 1 microsecond (µs) and 100 µs.

Advantageously, the second phase also comprises comparing the number of occurrences relative to each determined main lag $\tau_{S_{y'}/E_y}$ relative to a reference threshold. The reference threshold is for example chosen based on a percentage of the number of direct pulses received for each pair.

During the second phase, the main lags $\tau_{S_{y'}/E_y}$ whose values are not comprised in the reference value range and for which the number of occurrences is strictly below the reference threshold, are eliminated.

The second phase therefore makes it possible to eliminate aberrant values when the obtained main lag $\tau_{S_{y'}}/E_y$ is outside the plausible value range and isolated and insignificant values when the number of occurrences is below the reference threshold.

Then, the determining step 170 comprises a phase for calculating the distance $d_i$ of each source $E_i$ from the detector R, for each configuration, from calculated main lags $\tau_{S_{y'}/E_y}$ and directions of arrival of the pulses of each pair.

To that end, the resolution of the system of equations (5.1) and (5.2) is done.

In particular, for the first configuration of FIG. 2, the two pairs $(CTI_{j_{x1}}, \Theta_{k_{y1}}, \Theta_{k_{y2}}, \Delta t_{l_z}, \tau_{S_{y2}/E_{y1}})$ and $(CTI_{j_{x2}}, \Theta_{k_{y2}}, \Theta_{k_{y1}}, \Delta t_{l_z}, \tau_{S_{y1}/E_{y2}})$ of each group make it possible to obtain, on the one hand, the bistatic distance $\Delta_{S_{y2}/E_{y1}} = c\tau_{S_{y2}/E_{y1}}$ and the difference in direction of arrival $\alpha_{E_{y1}S_{y2}} = \theta_{k_{y1}} - \theta_{k_{y2}}$ and, on the other hand, the bistatic distance $\Delta_{S_{y1}/E_{y2}} = c\tau_{S_{y1}/E_{y2}}$ and the difference in direction of arrival $\alpha_{E_{y2}S_{y1}} = \theta_{k_{y2}} - \theta_{k_{y1}}$.

These expressions of bistatic distances and differences in direction of arrival are used to obtain the coefficients of equation system (6) given by expressions (9.1) and (9.2), or:

$$\begin{cases} b_{11} = \Delta^2_{S_{y1}/E_{y2}} \\ b_{12} = -2\Delta_{S_{y1}/E_{y2}} \\ b_{13} = 2\Delta_{S_{y1}/E_{y2}} \\ b_{14} = -2(1 - \cos(\alpha_{E_{y2}S_{y1}})) \end{cases} \quad (13.1)$$

and $$\begin{cases} b_{21} = -\Delta^2_{S_{y2}/E_{y1}} \\ b_{22} = -2\Delta_{S_{y2}/E_{y1}} \\ b_{23} = 2\Delta_{S_{y2}/E_{y1}} \\ b_{24} = 2(1 - \cos(\alpha_{E_{y1}S_{y2}})) \end{cases} \quad (13.2)$$

For the second configuration of FIG. 3, the three pairs $(CTI_{j_{x1}}, \Theta_{k_{y1}}, \Theta_{k_{y2}}, \Delta t_{l_z}, \tau_{S_{y2}/E_{y1}})$, $(CTI_{j_{x1}}, \Theta_{k_{y1}}, \Theta_{k_{y3}}, \Delta t_{l_z}, \tau_{S_{y3}/E_{y1}})$ and $(CTI_{j_{x2}}, \Theta_{k_{y2}}, \Theta_{k_{y3}}, \Delta t_{l_z}, \tau_{S_{y3}/E_{y2}})$ of each group make it possible to obtain:

the bistatic distance $\Delta_{S_{y2}/E_{y1}} = c\tau_{S_{y2}/E_{y1}}$ and the difference in direction of arrival $\alpha_{E_{y1}S_{y2}} = \theta_{k_{y1}} - \theta_{k_{y2}}$, the bistatic distance $\Delta_{S_{y3}/E_{y1}} = c\tau_{S_{y3}/E_{y1}}$ and the difference in direction of arrival $\alpha_{E_{y1}S_{y3}} = \theta_{k_{y1}} - \theta_{k_{y3}}$, and the bistatic distance $\Delta_{S_{y3}/E_{y2}} = c\tau_{S_{y3}/E_{y2}}$ and the difference in direction of arrival $\alpha_{E_{y2}S_{y3}} = \theta_{k_{y2}} - \theta_{k_{y3}}$.

These expressions of bistatic distances and differences in direction of arrival are used to obtain the coefficients of equation system (6) given by expressions (9.2) and (9.3), or:

$$\begin{cases} b_{11} = 2\Delta_{S_{y3}/E_{y1}} \cdot \Delta_{S_{y3}/E_{y2}}(\Delta_{S_{y3}/E_{y1}} - \Delta_{S_{y3}/E_{y2}}) \\ b_{12} = 2\Delta_{S_{y3}/E_{y2}}(2\Delta_{S_{y3}/E_{y1}} - \Delta_{S_{y3}/E_{y2}}(1 - \cos(\alpha_{E_{y1}S_{y3}}))) \\ b_{13} = 2\Delta_{S_{y3}/E_{y1}}(-2\Delta_{S_{y3}/E_{y2}} + \Delta_{S_{y3}/E_{y1}}(1 - \cos(\alpha_{E_{y2}S_{y3}}))) \\ b_{14} = 4\Delta_{S_{y3}/E_{y1}}(1 - \cos(\alpha_{E_{y2}S_{y3}})) - 4\Delta_{S_{y3}/E_{y2}}(1 - \cos(\alpha_{E_{y1}S_{y3}})) \end{cases} \quad (13.3)$$

and $$\begin{cases} b_{21} = -\Delta^2_{S_{y2}/E_{y1}} \\ b_{22} = -2\Delta_{S_{y2}/E_{y1}} \\ b_{23} = 2\Delta_{S_{y2}/E_{y1}} \\ b_{24} = 2(1 - \cos(\alpha_{E_{y1}S_{y2}})) \end{cases} \quad (13.2)$$

For the second configuration of FIG. 4, the three pairs $(CTI_{j_{x1}}, \Theta_{k_{y1}}, \Theta_{k_{y4}}, \Delta t_{l_z}, \tau_{S_{y4}/E_{y1}})$, $(CTI_{j_{x2}}, \Theta_{k_{y2}}, \Theta_{k_{y1}}, \Delta t_{l_z}, \tau_{S_{y1}/E_{y2}})$ and $(CTI_{j_{x2}}, \Theta_{k_{y2}}, \Theta_{k_{y4}}, \Delta t_{l_z}, \tau_{S_{y4}/E_{y2}})$ of each group make it possible to obtain:

the bistatic distance $\Delta_{S_{y4}/E_{y1}} = c\tau_{S_{y4}/E_{y1}}$ and the difference in direction of arrival $\alpha_{E_{y1}S_{y4}} = \theta k_{y1} - \theta_{k_{y4}}$, the bistatic distance $\Delta_{S_{y1}/E_{y2}} = c\tau_{S_{y1}/E_{y2}}$ and the difference in direction of arrival $\alpha_{E_{y2}S_{y1}} = \theta_{k_{y2}} - \theta_{k_{y1}}$, and the bistatic distance $\Delta_{S_{y4}/E_{y2}} = c\tau_{S_{y4}/E_{y2}}$ and the difference in direction of arrival $\alpha_{E_{y2}S_{y4}} = \theta_{k_{y2}} - 2\theta_{k_{y4}}$.

These expressions of bistatic distances and differences in direction of arrival are used to obtain the coefficients of equation system (6) given by expressions (9.1) and (9.3), or:

$$\begin{cases} b_{11} = \Delta^2_{S_{y1}/E_{y2}} \\ b_{12} = -2\Delta_{S_{y1}/E_{y2}} \\ b_{13} = 2\Delta_{S_{y1}/E_{y2}} \\ b_{14} = -2(1 - \cos(\alpha_{E_{y2}S_{y1}})) \end{cases} \quad (13.1)$$

And $$\begin{cases} b_{21} = 2\Delta_{S_{y4}/E_{y1}} \cdot \Delta_{S_{y4}/E_{y2}}(\Delta_{S_{y4}/E_{y1}} - \Delta_{S_{y4}/E_{y2}}) \\ b_{22} = 2\Delta_{S_{y4}/E_{y2}}(2\Delta_{S_{y4}/E_{y1}} - \Delta_{S_{y4}/E_{y2}}(1 - \cos(\alpha_{E_{y1}S_{y4}}))) \\ b_{23} = 2\Delta_{S_{y4}/E_{y1}}(-2\Delta_{S_{y4}/E_{y2}} + \Delta_{S_{y4}/E_{y1}}(1 - \cos(\alpha_{E_{y2}S_{y4}}))) \\ b_{24} = 4\Delta_{S_{y4}/E_{y1}}(1 - \cos(\alpha_{E_{y2}S_{y4}})) - 4\Delta_{S_{y4}/E_{y2}}(1 - \cos(\alpha_{E_{y1}S_{y4}})) \end{cases} \quad (13.4)$$

For the third configuration of FIG. 5, the four pairs $(CTI_{j_{x1}}, \Theta_{k_{y1}}, \Theta_{k_{y3}}, \Delta t_{l_z}, \tau_{S_{y3}/E_{y1}})$, $(CTI_{j_{x1}}, \Theta_{k_{y1}}, \Theta_{k_{y4}}, \Delta t_{l_z}, \tau_{S_{y4}/E_{y1}})$, $(CTI_{j_{x2}}, \Theta_{k_{y2}}, \Theta_{k_{y3}}, \Delta t_{l_z}\tau_{S_{y3}/E_{y2}})$ and $(CTI_{j_{x2}}, \Theta_{k_{y2}}, \Theta_{k_{y4}}, \Delta t_{l_z}, \tau_{S_{y4}/E_{y2}})$ of each group make it possible to obtain:

the bistatic distance $\Delta_{S_{y3}/E_{y1}} = c\tau_{S_{y3}/E_{y1}}$ and the difference in direction of arrival $\alpha_{E_{y1}S_{y3}} = \theta_{k_{y1}} - \theta_{k_{y3}}$, the bistatic distance $\Delta_{S_{y4}/E_{y1}} = c\tau_{S_{y4}/E_{y1}}$ and the difference in direction of arrival $\alpha_{E_{y1}S_{y4}} = \theta_{k_{y1}} - \theta_{k_{y4}}$, the bistatic distance $\Delta_{S_{y3}/E_{y2}} = c\tau_{S_{y3}/E_{y2}}$ and the difference in direction of arrival $\alpha_{E_{y2}S_{y3}} = \theta_{k_{y2}} - \theta_{k_{y3}}$, and the bistatic distance $\Delta_{S_{y4}/E_{y2}} = c\tau_{S_{y4}/E_{y2}}$ and the difference in direction of arrival $\alpha_{E_{y2}S_{y4}} = \theta_{k_{y2}} - 2\theta_{k_{y4}}$.

These expressions of bistatic distances and differences in direction of arrival are used to obtain the coefficients of equation system (6) given by expressions (9.3) and (9.4), or:

$$\begin{cases} b_{11} = 2\Delta_{S_{y3}/E_{y1}} \cdot \Delta_{S_{y3}/E_{y2}} (\Delta_{S_{y3}/E_{y1}} - \Delta_{S_{y3}/E_{y2}}) \\ b_{12} = 2\Delta_{S_{y3}/E_{y2}} (2\Delta_{S_{y3}/E_{y1}} - \Delta_{S_{y3}/E_{y2}} (1 - \cos(\alpha_{E_{y1}S_{y3}}))) \\ b_{13} = 2\Delta_{S_{y3}/E_{y1}} (-2\Delta_{S_{y3}/E_{y2}} + \Delta_{S_{y3}/E_{y1}} (1 - \cos(\alpha_{E_{y2}S_{y3}}))) \\ b_{14} = 4\Delta_{S_{y3}/E_{y1}} (1 - \cos(\alpha_{E_{y2}S_{y3}})) - 4\Delta_{S_{y3}/E_{y2}} (1 - \cos(\alpha_{E_{y1}S_{y3}})) \end{cases} \quad (13.3)$$

and $$\begin{cases} b_{21} = 2\Delta_{S_{y4}/E_{y1}} \cdot \Delta_{S_{y4}/E_{y2}} (\Delta_{S_{y4}/E_{y1}} - \Delta_{S_{y4}/E_{y2}}) \\ b_{22} = 2\Delta_{S_{y4}/E_{y2}} (2\Delta_{S_{y4}/E_{y1}} - \Delta_{S_{y4}/E_{y2}} (1 - \cos(\alpha_{E_{y1}S_{y4}}))) \\ b_{23} = 2\Delta_{S_{y4}/E_{y1}} (-2\Delta_{S_{y4}/E_{y2}} + \Delta_{S_{y4}/E_{y1}} (1 - \cos(\alpha_{E_{y2}S_{y4}}))) \\ b_{24} = 4\Delta_{S_{y4}/E_{y1}} (1 - \cos(\alpha_{E_{y2}S_{y4}})) - 4\Delta_{S_{y4}/E_{y2}} (1 - \cos(\alpha_{E_{y1}S_{y4}})) \end{cases} \quad (13.4)$$

The distance $d_{y2}$ from the second source $E_2$ to the detector R is given by expression (12), the coefficients of which are those of expressions (11.2), (11.3) and (11.4), corresponding to the values of the $b_{ij}$ previously obtained (13.1), (13.2), (13.3) or (13.4) depending on the configurations.

The distance $d_{y1}$ from the first source $E_1$ to the detector R is given by expression (10).

The distance $RS_{y3}$ from the first reflector $S_{y3}$ to the detector R is given by expression (3); one therefore obtains:

$$RS_{y3} = \frac{\Delta^2_{S_{y3}/E_{y2}} + 2\Delta_{S_{y3}/E_{y2}} \cdot d_{y2}}{2\Delta_{S_{y3}/E_{y2}} + 2d_{y2}(1 - \cos(\alpha_{E_{y2}S_{y3}}))} \quad (14)$$

The distance $RS_{y4}$ from the second reflector $S_{y4}$ to the detector R is given by expression (3); one therefore obtains:

$$RS_{y4} = \frac{\Delta^2_{S_{y4}/E_{y2}} + 2\Delta_{S_{y4}/E_{y2}} \cdot d_{y2}}{2\Delta_{S_{y4}/E_{y2}} + 2d_{y2}(1 - \cos(\alpha_{E_{y2}S_{y4}}))} \quad (15)$$

The described method therefore makes it possible to locate sources $E_1, \ldots, E_n$ from a single quasi-static detector relative to the sources to be located. Such a method also allows the localization of reflectors located in the environment of the sources to be located.

More specifically, such a method makes it possible to locate two sources in an environment comprising at least said sources and two reflectors irrespective of the configuration of the sources and reflectors on the sole condition that the reflectors are not co-located relative to one another and the sources are not co-located relative to one another.

The method proposes to solve a single system of equations for all possible configurations with coefficients specific to each of said configurations.

The location of the sources is based solely on measurements of directions of arrival and dates of arrival of the radar pulses coming directly from emitters and indirectly from the latter via reflections on reflective physical objects of the environment.

The invention claimed is:

1. A method for locating at least two sources emitting electromagnetic pulses in an environment, the environment comprising at least two reflectors, the method comprising:
 receiving, by a detector, for each source to be located, for an operating duration of the detector, at least one same emitted pulse, received on the one hand directly from said source and received on the other hand by reflection on one of the reflectors;
 measuring, by the detector, a direction of arrival, a date of arrival and at least one invariant characteristic of each received pulse;
 identifying, among the received pulses, the pulses received directly and the pulses received by reflection;
 grouping by pairs of pulses received directly with pulses received by reflection, the pulses of each pair having the same invariant characteristics and different directions of arrival;
 calculating, for each pair, a difference between the date of arrival of the pulse received by reflection relative to the date of arrival of the pulse received directly; and
 determining a distance of each source from the detector from calculated differences in dates of arrival and from the directions of arrival of the pulses of each pair.

2. The method according to claim 1, wherein the method duration is comprised of time brackets with identical durations, the method comprising defining a sliding duration at least equal to duration of a time bracket, said identification and said grouping being carried out over the sliding duration, the pulses of each pair belonging to a same time bracket.

3. The method according to claim 2, further comprising, for each time bracket, sorting the received pulses based on the direction of arrival and on the invariant characteristics of each pulse to obtain sub-series of pulses, the pulses of each sub-series having equal directions of arrival and equal invariant characteristics, the pulses of each sub-series being grouped together in a same pair during said grouping.

4. The method according to claim 3, wherein said measuring comprises determining, on the successive sub-series of each sliding duration, of a maximum power from among the powers of the pulses of the sub-series having equal directions of arrival, equal invariant characteristics and belonging to a same sliding duration, the pulses received directly and the pulses received by reflection being identified, for each sub-series of pulses, by comparing the maximum power determined for the sub-series to at least two thresholds.

5. The method according to claim 4, wherein the pulses of the sub-series associated with the maximum power are identified as received directly when the maximum power is greater than or equal to a first threshold and the pulses of the sub-series associated with the maximum power are identified as received by reflection when the maximum power is strictly below a second threshold, the second threshold being less than or equal to the first threshold.

6. The method according to claim 1, wherein said determining the distance comprises gathering pairs over predetermined durations to form groups of two pairs, three pairs or four pairs, the number of pairs per group being equal to the number of different directions of arrival corresponding to the pulses received over a predetermined duration, the distance from each source to the detector being determined from differences in dates of arrival calculated for the pairs of each group and from the directions of arrival of the pulses of the pairs of each group, each group of two pairs comprising:
  a first pair of pulses of invariant characteristics equal to a first invariant characteristic, of different directions of arrival; and
  a second pair of pulses of invariant characteristics equal to a second invariant characteristic and with same different directions of arrival;
each group of three pairs comprising:
  a first pair of pulses of invariant characteristics equal to a first invariant characteristic, with directions of arrival respectively equal to a first and second direction of arrival different from one another;
  a second pair of pulses of invariant characteristics equal to the first invariant characteristic, with directions of arrival respectively equal to the first and a third direction of arrival, the third direction of arrival being different from the first and second directions of arrival; and
  a third pair of pulses of invariant characteristics equal to a second invariant characteristic different from the first invariant characteristic, with directions of arrival respectively equal to the second and third directions of arrival; and
each group of four pairs comprising:
  a first pair of pulses of invariant characteristics equal to a first invariant characteristic, with directions of arrival respectively equal to a first and second direction of arrival different from one another;
  a second pair of pulses of invariant characteristics equal to the first invariant characteristic, with directions of arrival respectively equal to the first and a third direction of arrival, the third direction of arrival being different from the first and second directions of arrival;
  a third pair of pulses of invariant characteristics equal to a second invariant characteristic different from the first invariant characteristic, with directions of arrival respectively equal to the third and a fourth direction of arrival, the fourth direction of arrival being different from the first, second and third directions of arrival; and
  a fourth pair of pulses of invariant characteristics equal to the second invariant characteristic, with directions of arrival respectively equal to the third and fourth directions of arrival.

7. The method according to claim 6, wherein each group makes it possible to determine the respective distances of two of the sources to be located from the detector, said distances being calculated:
  for each group of two pairs of pulses, from the following equations:

$$\begin{cases} d_1 = \dfrac{\Delta^2_{S_1/E_2} + 2\Delta_{S_1/E_2} \cdot d_2}{2\Delta_{S_1/E_2} + 2d_2(1 - \cos(\alpha_{E_2 S_1}))} \\ d_2 = \dfrac{\Delta^2_{S_2/E_1} + 2\Delta_{S_2/E_1} \cdot d_1}{2\Delta_{S_2/E_1} + 2d_1(1 - \cos(\alpha_{E_1 S_2}))} \end{cases}$$

for each group of three pairs of pulses, from the following equations:

$$\begin{cases} \dfrac{\Delta^2_{S_1/E_1} + 2\Delta_{S_1/E_1} \cdot d_1}{2\Delta_{S_1/E_1} + 2d_1(1 - \cos(\alpha_{E_1 S_1}))} = \dfrac{\Delta^2_{S_1/E_2} + 2\Delta_{S_1/E_2} \cdot d_2}{2\Delta_{S_1/E_2} + 2d_2(1 - \cos(\alpha_{E_2 S_1}))} \\ d_2 = \dfrac{\Delta^2_{S_2/E_1} + 2\Delta_{S_2/E_1} \cdot d_1}{2\Delta_{S_2/E_1} + 2d_1(1 - \cos(\alpha_{E_1 S_2}))} \end{cases}$$

or $$\begin{cases} d_1 = \dfrac{\Delta^2_{S_1/E_2} + 2\Delta_{S_1/E_2} \cdot d_2}{2\Delta_{S_1/E_2} + 2d_2(1 - \cos(\alpha_{E_2 S_1}))} \\ \dfrac{\Delta^2_{S_2/E_1} + 2\Delta_{S_2/E_1} \cdot d_1}{2\Delta_{S_2/E_1} + 2d_1(1 - \cos(\alpha_{E_1 S_2}))} = \dfrac{\Delta^2_{S_2/E_2} + 2\Delta_{S_2/E_2} \cdot d_2}{2\Delta_{S_2/E_2} + 2d_2(1 - \cos(\alpha_{E_2 S_2}))} \end{cases}$$

for each group of four pairs of pulses, from the following equations:

$$\begin{cases} \dfrac{\Delta^2_{S_1/E_1} + 2\Delta_{S_1/E_1} \cdot d_1}{2\Delta_{S_1/E_1} + 2d_1(1 - \cos(\alpha_{E_1 S_1}))} = \dfrac{\Delta^2_{S_1/E_2} + 2\Delta_{S_1/E_2} \cdot d_2}{2\Delta_{S_1/E_2} + 2d_2(1 - \cos(\alpha_{E_2 S_1}))} \\ \dfrac{\Delta^2_{S_2/E_1} + 2\Delta_{S_2/E_1} \cdot d_1}{2\Delta_{S_2/E_1} + 2d_1(1 - \cos(\alpha_{E_1 S_2}))} = \dfrac{\Delta^2_{S_2/E_2} + 2\Delta_{S_2/E_2} \cdot d_2}{2\Delta_{S_2/E_2} + 2d_2(1 - \cos(\alpha_{E_2 S_2}))} \end{cases}$$

where $\Delta_{S_1/E_1} = c \cdot \tau_{S_1/E_1}, \Delta_{S_2/E_2} = c \cdot \tau_{S_2/E_2}, \Delta_{S_1/E_2} = c \cdot \tau_{S_1/E_2}, \Delta_{S_2/E_1} = c \cdot \tau_{S_2/E_1}$, $d_1$ is the distance from the first source $E_1$ to the detector,
$d_2$ is the distance from the second source $E_2$ to the detector,
c is the propagation speed of the electromagnetic waves,
$\tau_{S_1/E_1}$ is the difference in date of arrival among the pulses received by reflection on a first reflector relative to the pulses received directly from the first source,
$\tau_{S_2/E_2}$ is the difference in date of arrival among the pulses received by reflection on a second reflector relative to the pulses received directly from the second source,
$\tau_{S_1/E_2}$ is the difference in date of arrival among the pulses received by reflection on the first reflector relative to the pulses received directly from the second source,
$\tau_{S_1/E_1}$ is the difference in date of arrival among the pulses received by reflection on the second reflector relative to the pulses received directly from the first source,
$\alpha_{E_2/S_2}$ is the angular deviation between the second source and the second reflector seen from the detector,
$\alpha_{E_1/S_1}$ is the angular deviation between the first source and the first reflector seen from the detector,
$\alpha_{E_2/S_1}$ is the angular deviation between the second source and the first reflector seen from the detector, and
$\alpha_{E_1/S_2}$ is the angular deviation between the second source and the first reflector seen from the detector.

8. The method according to claim 7, wherein said determining the distance comprises calculating a histogram, for each pair, from differences in dates of arrival calculated for the pair and determining a main lag of the pulses received by reflection relative to the pulses received directly from the calculated histogram, the differences in date of arrival of the equations of claim 7 respectively being equal to one of the determined main lags.

9. The method according to claim 8, wherein the invariant characteristics of each pulse comprise at least one of the features from among: a width of the pulse, a carrier frequency of the pulse, and an intentional intra-pulse modulation.

10. A detector for locating at least two electromagnetic pulse emission sources in an environment, the environment comprising at least two reflectors, the detector being able to carry out the method according to claim 1.

* * * * *